US 9,669,743 B2

(12) United States Patent
Radler et al.

(10) Patent No.: US 9,669,743 B2
(45) Date of Patent: Jun. 6, 2017

(54) SEAT FRAME OF A VEHICLE SEAT (71) Applicant: Brose Fahrzeugteile GmbH & Co. Kommanditgesellschaft, Coburg, Coburg (DE)

(72) Inventors: Sebastian Radler, Coburg (DE); Frieder Krüger, Coburg (DE); Michael Heilingloh, Bad Rodach-Elsa (DE); Volker Möller, Coburg (DE); Armin Schafhauser, Bad Rodach (DE); Jürgen Siller, Rödental (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 14/764,506

(22) PCT Filed: Jan. 28, 2014

(86) PCT No.: PCT/EP2014/051577
§ 371 (c)(1),
(2) Date: Nov. 10, 2015

(87) PCT Pub. No.: WO2014/118146
PCT Pub. Date: Aug. 7, 2014

(65) Prior Publication Data
US 2016/0075264 A1 Mar. 17, 2016

(30) Foreign Application Priority Data
Jan. 30, 2013 (DE) .................. 10 2013 201 514

(51) Int. Cl.
*B60N 2/20* (2006.01)
*B60N 2/225* (2006.01)
(Continued)

(52) U.S. Cl.
CPC .............. *B60N 2/682* (2013.01); *B60N 2/22* (2013.01); *B60N 2/2252* (2013.01)

(58) Field of Classification Search
CPC ......... B60N 2/682; B60N 2/22; B60N 2/2252
(Continued)

(56) References Cited

U.S. PATENT DOCUMENTS 3,972,563 A * 8/1976 Gustafsson .......... B60N 2/2251
297/362 X
4,020,717 A * 5/1977 Johnson ............... B60N 2/2252
297/362
(Continued)

FOREIGN PATENT DOCUMENTS

DE 43 39 508 A1 5/1994
DE 100 21 403 A1 11/2001
(Continued)

*Primary Examiner* — Rodney B White
(74) *Attorney, Agent, or Firm* — Lewis Roca Rothgerber Christie LLP (57) ABSTRACT

A seat frame of a vehicle seat comprises a first frame part, a second frame part, a fitting which pivotally connects the first frame part with the second frame part about a swivel axis, a first fitting part of the fitting, which is connected with the first frame part, and a second fitting part of the fitting, which is connected with the second frame part, which for pivoting the first frame part and the second frame part relative to each other is adjustable with respect to the first fitting part. At least one of the first fitting part and the second fitting part has an annular collar surface extending around the swivel axis and pointing radially to the outside, via which the associated fitting part is connected with an annular bearing portion of the associated frame part, which delimits an opening.

11 Claims, 5 Drawing Sheets

(51) Int. Cl.
*B60N 2/68* (2006.01)
*B60N 2/22* (2006.01)

(58) Field of Classification Search
USPC .................................. 297/354.1, 354.12, 362
See application file for complete search history.

(56) References Cited

U.S. PATENT DOCUMENTS

| | | | |
|---|---|---|---|
| 4,025,109 A | 5/1977 | Klingelhöfer et al. | |
| 4,211,451 A * | 7/1980 | Shephard | B60N 2/2251 297/362 X |
| 5,524,970 A * | 6/1996 | Kienke | B60N 2/2255 297/362 |
| 5,542,772 A | 8/1996 | Reuber et al. | |
| 5,573,345 A | 11/1996 | Voss et al. | |
| 6,619,743 B1 * | 9/2003 | Scholz | B60N 2/225 297/362 |
| 6,830,298 B2 * | 12/2004 | Koczewski | B60N 2/224 297/362 |
| 7,090,298 B2 * | 8/2006 | Lange | B60N 2/2252 297/362 |
| 7,543,889 B2 * | 6/2009 | Huang | B60N 2/2252 297/362 |
| 7,644,989 B2 | 1/2010 | Baloche Faurecia | |
| 7,753,450 B2 * | 7/2010 | Eppert | B60N 2/2254 297/362 X |
| 8,366,198 B2 * | 2/2013 | Thiel | B60N 2/206 297/354.1 |
| 8,485,599 B2 * | 7/2013 | Thiel | B60N 2/20 297/362 X |
| 8,851,572 B2 * | 10/2014 | Schuhmacher | B60N 2/4435 297/362 |
| 9,033,418 B2 * | 5/2015 | Jokiel | B60N 2/2254 297/362 |
| 9,050,643 B2 | 6/2015 | Wolsiefer et al. | |
| 9,085,249 B2 | 7/2015 | Jokiel et al. | |
| 2007/0234536 A1 | 10/2007 | Frauchiger | |
| 2010/0320823 A1 * | 12/2010 | Thiel | B60N 2/20 297/354.1 |
| 2011/0062760 A1 | 3/2011 | Zellmann et al. | |
| 2012/0306253 A1 * | 12/2012 | Seibold | B60N 2/68 297/354.1 |
| 2013/0009439 A1 * | 1/2013 | Jokiel | B60N 2/2252 297/362 |
| 2013/0334857 A1 * | 12/2013 | Wolsiefer | B21D 26/14 297/354.1 |
| 2014/0210242 A1 * | 7/2014 | Schueler | B60N 2/123 297/362 |

FOREIGN PATENT DOCUMENTS

| | | |
|---|---|---|
| DE | 10 2006 015 361 A1 | 10/2006 |
| DE | 20 2008 003 706 U1 | 9/2009 |
| DE | 10 2008 028 094 A1 | 12/2009 |
| DE | 10 2008 028 105 A1 | 12/2009 |
| DE | 10 2009 022 767 B3 | 5/2010 |
| DE | 10 2010 013 091 A1 | 9/2011 |
| DE | 10 2010 033 704 A1 | 2/2012 |
| DE | 10 2010 035 442 A1 | 2/2012 |
| DE | 10 2010 043 625 A1 | 5/2012 |
| EP | 1 074 426 A2 | 2/2001 |
| EP | 1 837 229 A1 | 9/2007 |
| JP | 11-280788 A | 10/1999 |
| WO | WO 2010/020340 A2 | 2/2010 |
| WO | WO 2012/084117 A1 | 6/2012 |

* cited by examiner

SEAT FRAME OF A VEHICLE SEAT

CROSS-REFERENCE TO A RELATED APPLICATION

This application is a National Phase Patent Application of International Patent Application Number PCT/EP2012/051577, filed on Jan. 28, 2014, which claims priority of German Patent Application Number 10 2013 201 514.3, filed on Jan. 30, 2013.

BACKGROUND

The invention relates to a seat frame of a vehicle seat.

Such seat frame of a vehicle seat comprises a first frame part, a second frame part and a fitting which pivotally connects the first frame part with the second frame part about a swivel axis. With the first frame part a first fitting part of the fitting and with the second frame part a second fitting part of the fitting is connected, which are adjustable relative to each other for pivoting the frame parts. At least one of the first fitting part and the second fitting part has an annular collar surface extending around the swivel axis and pointing radially to the outside, via which the associated fitting part is connected with an annular bearing portion of the associated frame part, which delimits an opening.

Such fitting can be formed as rotary fitting or as detent fitting. When the fitting is formed as rotary fitting, the two fitting parts for example realize a wobble transmission in which, driven by an eccentric mounted on the first fitting part and rotatable relative to the first fitting part, the second fitting part can be put into a wobbling rotary movement relative to the first fitting part, so as to pivot the second frame part connected with the second fitting part relative to the first frame part connected with the first fitting part.

A rotary fitting of this kind is known for example from DE 10 2008 028 105 A1, in which the first fitting part is formed as a hollow gear carrying an internal toothing and the second fitting part is formed as an internal gear carrying an external toothing, and via an eccentric the internal gear can be rotated relative to the hollow gear in a wobbling manner.

The invention however also relates to a seat frame with a fitting formed as detent fitting, as it is known for example from DE 20 2008 003 706 U1. In the detent fitting known from DE 20 2008 003 706 U1, locking bolts are radially shiftably arranged on a first fitting part, which can be brought in engagement with a toothing of a second fitting part pivotally mounted relative to the first fitting part, so that in a locked condition the fitting parts cannot be pivoted relative to each other, whereas in an unlocked condition an adjustment of the fitting parts relative to each other is possible.

The fitting serves for pivotally connecting the two frame parts of the seat frame with each other. For example, when a backrest and a seat part of a vehicle seat are coupled with each other via the fitting, large forces—as a result of the load exerted on the backrest by a vehicle occupant due to weight forces acting in normal operation or load forces acting in the case of a crash—must be dissipated via the fitting and be passed from the backrest via the fitting into the seat part and thereby into the vehicle body. These load forces chiefly act as torques about the swivel axis of the fitting—with the backrest acting as lever—, so that the attachment of the fitting to the frame parts of the seat frame must be formed so stable that the forces and moments acting between fitting and frame parts can be dissipated in a reliable way, without the fitting parts being detached from the associated frame parts.

In today's seat frames a fitting part frequently is welded to the associated frame part for example by means of laser welding, in order to create a firm connection. However, it should be taken into account that when fitting the fitting part into the associated frame part by inserting the collar surface into the associated opening of the frame part, tolerances can occur, which can lead to a considerable joining gap between the collar surface of the fitting part and the bearing portion of the frame part. When the fitting part is not centrically fitted into the associated frame part, this joining gap is non-uniform as a result of a varying distance between the collar surface and the bearing portion, which is disadvantageous in particular when the width of the joining gap exceeds the bridging of a gap achievable with a used welding method.

As a result, welding spatters can occur to an increased extent, which are deposited on the seat frame or also on the manufacturing facility. In addition, seam collapses or seam reinforcements can occur as a result of deposited welding spatters, holes can occur in the welding seam, and the welding seam at least partly can have a reduced strength. All this can contribute to an increased scrap rate during manufacture, also can lead to a slower welding and thus process speed, and possibly can be monitored only with difficulty.

In a seat frame known from DE 10 2010 043 625 A1, a reinforcement part is provided for connecting a fitting part with a frame part, which produces the connection of the fitting part formed as hollow gear to the frame part and at the same time reinforces the point of attachment of the fitting part to the frame part for an improved load dissipation.

In a fitting known from WO 2010/020340 A2 bearing points are provided between an external element and an internal element, which should serve to adjust a gap between the external element and the internal element with a defined minimum width. The width should not fall below this minimum width. For connecting the external element and the internal element, the gap is filled by welding by using a filler material.

SUMMARY

It is an object of the present invention to provide a seat frame in which the connection of a fitting part to an associated frame part is improved with a simple connection process.

This object is solved by a seat frame with the features as described herein.

Accordingly, the collar surface and the bearing portion delimiting the opening are in gap-free contact with each other at least at predetermined portions by action of a pretensioning force radial to the swivel axis.

The present invention proceeds from the idea to at least sectionally bring the collar surface and the bearing portion delimiting the opening into a gap-free contact. The gap-free contact ensures that at least at these portions a laser welding seam can easily be applied, without incurring the risk of a welding seam of reduced quality, e.g. due to a variable, possibly too large gap width and a seam collapse resulting therefrom. The gap-free contact is ensured in that between the collar surface and the bearing portion a radial pretensioning force at least sectionally acts, which brings the collar surface and the bearing portion into pressing contact with each other at least in predetermined portions.

The radial pretensioning force can be specified in various ways.

Thus, it is possible that the collar surface is pressed into the opening delimited by the bearing portion. The collar surface and the bearing portion delimiting the opening thereby can circumferentially, i.e. all around the annular collar surface and the annular bearing portion, be brought into pressing contact with each other, wherein for this purpose the collar surface and the bearing portion advantageously have a maximum deviation from the ideal roundness of +/−0.3 mm. This means that the maximum deviation from an ideal circular shape of the collar surface and/or the bearing portion as measured in radial direction (based on the swivel axis) does not exceed 0.3 mm. The deviation for example can lie between 0.05 mm and 0.25 mm.

To bring the collar surface into pressing contact with the bearing portion, the collar surface in a concrete aspect has an interference fit with the bearing portion delimiting the opening. The interference fit can exist all around, in that the annular collar surface has an oversize relative to the opening delimited by the contact portion. Correspondingly, the collar surface is pressed into the opening for assembly, wherein both the collar surface and the abutment surface maintain their shape, i.e. are at least not noticeably deformed. The radial pretensioning force is effected in that due to the oversize the bearing portion pressingly surrounds the collar surface and under pretension radially acts on the collar surface, so that a substantially gap-free contact between the collar surface and the bearing portion is obtained.

It can, however, also be provided that an oversize only exists at predetermined portions, for example at radially projecting protrusions of the collar surface or of the bearing portion. The press fit of the collar surface with the bearing portion thus only is produced in the region of the predetermined portions, so that when pressing the collar surface into the opening, the collar surface and the bearing portion (only) get in pressing contact in the region of predetermined portions.

The collar surface and the bearing portion preferably are welded, in particular laser-welded to each other, where they rest against each other without leaving a gap. When the collar surface rests against the bearing portion around the entire circumference without leaving a gap by action of the radial pretension, a laser welding seam can circumferentially be made around the collar surface, so that a circumferential welding connection is produced between the collar surface and the bearing portion. When the collar surface and the bearing portion pressingly rest against each other only in the region of predetermined portions, a welding connection advantageously is produced at these predetermined portions, wherein the welding connection can be limited to the predetermined portions or possibly also in other portions, at which no pressing contact exists, one or more welding seams can be applied.

The oversize of the annular collar surface relative to the opening delimited by the bearing portion for example maximally can be 0.5 mm. This means that the outside diameter of the annular collar surface is greater than the inside diameter of the opening delimited by the bearing portion by maximally 0.5 mm, for example by between 0.1 mm and 0.4 mm.

Advantageously, the collar surface and/or the bearing portion have at least one discontinuity for minimizing a joining gap between the collar surface and the bearing portion or for centering the collar surface relative to the bearing portion.

This proceeds from the idea to provide measures which minimize a joining gap between the annular collar surface and the annular bearing portion or at least render the same more uniform by centering the collar surface relative to the bearing portion. The measures should effect that in the optimal case the width of joining gap is reduced to zero or that the joining gap, which circumferentially extends between the annular collar surface of the fitting part and the annular bearing portion of the associated frame part, has an approximately equal width in circumferential direction and thus the distance between the collar surface and the bearing portion at least is approximately the same in circumferential direction.

By this measure it is achieved that between the collar surface and the bearing portion no large distances can occur due to unfavorable tolerance pairings. The resulting minimized or uniform joining gap can be bridged in a safe, reliable way for example by means of laser welding, so that a welding seam of high quality can be produced for the firm connection of the fitting part with the associated frame part.

The minimization of the joining gap between the collar surface and the bearing portion or the centering of the collar surface relative to the bearing portion, in order to render the joining gap more uniform, is achieved via at least one discontinuity which is provided on the collar surface and/or the bearing portion. This discontinuity can be realized in different ways.

In a first variant, at least three radially projecting protrusions can be arranged as discontinuities on the collar surface and/or the bearing portion.

Three protrusions for example can be arranged on the collar surface of the fitting part, which radially project from the collar surface to the outside in direction of the associated bearing portion of the frame part and serve to adjust a joining gap between the collar surface and the bearing portion in a centering way such that it has an at least approximately equal width in circumferential direction.

Alternatively or in addition, at least three protrusions can be arranged on the bearing portion, wherein in this case the protrusions radially project from the bearing portion to the inside in direction of the bottom surface.

It also is conceivable and possible to provide protrusions both on the collar surface and on the bearing portion, wherein in this case at total of at least three protrusions are to be provided, for example two protrusions on the collar surface and one protrusion on the bearing portion, wherein it is also possible, however, to provide at least three protrusions each both on the collar surface and on the bearing portion.

The protrusions for example can be integrally molded to the collar surface and/or the bearing portion and advantageously extend axially parallel to the swivel axis on the collar surface and/or the bearing portion. In this case, the protrusions are integrally molded during manufacture to the collar surface below the bearing portion and thus already are present at the associated frame parts during assembly of the fitting.

Advantageously, an interference fit is formed at the protrusions, so that on insertion of the fitting part into the opening of the frame part a press fit is produced at the protrusions. Via the protrusions, the collar surface of the fitting part and the bearing portion of the frame part thus get in pressing contact with each other, so that at the protrusions a gap-free contact exists between the collar surface and the bearing portion. In so far, the protrusions form predetermined portions via which the collar surface rests against the bearing portion without leaving a gap.

Alternatively, it is also conceivable to integrally mold the protrusions to the collar surface and/or the bearing portion after inserting the fitting part into the opening of the frame part, wherein this advantageously is effected during assembly in connection with the attachment of a fitting part to the associated frame part. By introducing the protrusions into the collar surface and/or the bearing portion during assembly, the collar surface and/or the bearing portion are made non-round, so as to achieve a centering of the collar surface on the bearing portion and a gap-free, pressing contact at defined, predetermined portions.

Introducing the protrusions into the collar surface for example can be effected by pressing a stamp into a central bore of the fitting part such that the protrusions are pressed out of the collar surface radially to the outside.

In an advantageous aspect, the collar surface and the bearing portion form an interference fit. When providing discontinuities in the form of protrusions, which act between the collar surface and the bearing portion, the interference fit exists between the protrusions on the one component and the associated other component. When the protrusions for example are formed on the collar surface, the protrusions of the collar surface form an interference fit together with the bearing portion. Because the protrusions are provided on the collar surface only locally, the attachment of the fitting part to the associated frame part is possible with a smaller expenditure of force—as compared to a full-surface interference fit —, wherein via the protrusions a reliable centering and a uniform joining gap with constant width are obtained.

In a second variant—which can be used as an alternative or in addition to the first variant—at least one gap is arranged as discontinuity on the collar surface and/or the bearing portion, which interrupts the collar surface or the bearing portion in circumferential direction about the swivel axis. The gap interrupts the annular collar surface or the annular bearing portion, so that the collar surface or the bearing portion is not closed, but circumferentially open at one point at least.

When the gap is arranged on the collar surface of the fitting part, the gap advantageously extends axially parallel to the swivel axis and thus at least sectionally separates the collar surface. The gap need not necessarily extend over the entire axial height of the collar surface, but at least extends over the region of the collar surface with which the collar surface is to be fitted into the associated opening of the fitting part. By the fact that the gap extends axially parallel to the swivel axis it is to be understood that the gap extends in axial direction in an oblong fashion and its oblong extension length thus is greater than its extension length in circumferential direction.

Alternatively or in addition, a gap also can be provided at the bearing portion, wherein in this case the gap preferably extends radially to the swivel axis and thus from the bearing portion to the outside.

The discontinuity in the form of the gap has the purpose that in the case of an interference fit between the collar surface and the bearing portion, the collar surface and/or the bearing portion can widen when being mounted, so that for mounting a smaller force is required than in the case of a full-surface interference fit without discontinuity, and the collar surface and the bearing portion at least sectionally reliably get in contact with each other under radial pretension. In this case, the joining gap between the collar surface and the bearing portion is reduced to approximately zero and thus minimized, so that the components can easily be connected with each other by welding, in particular by laser welding.

One or more gaps can be provided on the collar surface and/or the bearing portion. By separating the collar surface and/or the bearing portion by several gaps, the required force for mounting can further be reduced.

When several discontinuities—for example several protrusions and/or several gaps—are provided, these discontinuities preferably are arranged on the collar surface and/or the bearing portion equally distributed in circumferential direction. Thus, an equally distributed effect of the discontinuities is obtained for minimizing a joining gap or for centering the collar surface relative to the bearing portion.

BRIEF DESCRIPTION OF THE DRAWINGS

The idea underlying the invention will be explained in detail below with reference to the exemplary embodiments illustrated in the Figures.

DETAILED DESCRIPTION

Figure 1:
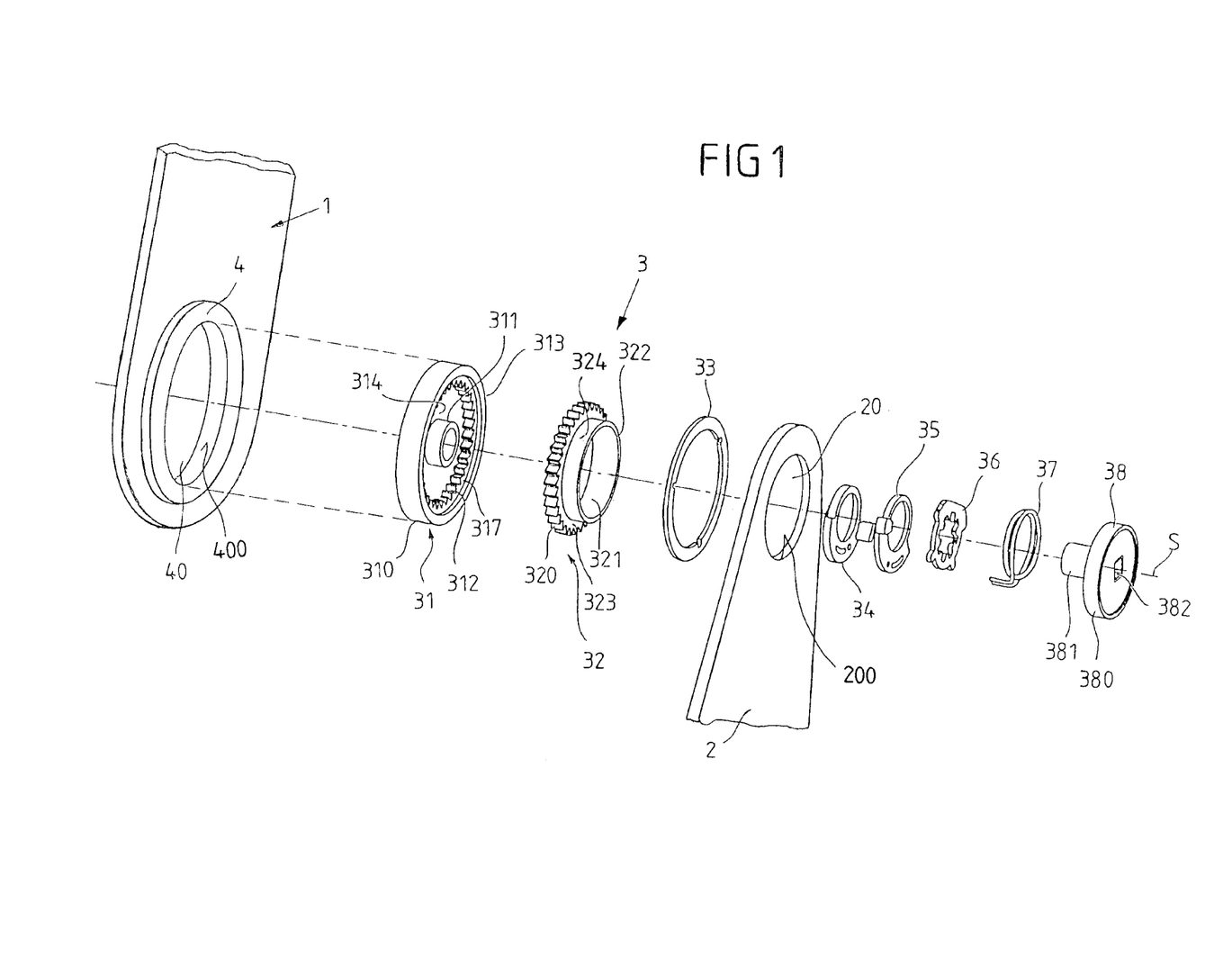
FIG. 1 shows a view of a fitting in the form of a rotary fitting for pivotally connecting a first frame part with a second frame part of a seat frame about a swivel axis.

FIG. 1 shows a perspective exploded view of a first frame part 1 and a second frame part 2, which each are part of a seat frame of a vehicle seat. The first frame part 1 for example can be part of a backrest structure of the vehicle seat, while the second frame part 2 for example is part of a seat part structure. The backrest structure is pivotally connected with the seat part structure about a swivel axis S, in order to be able to adapt the inclination of a backrest of the vehicle seat with respect to a seat part of the vehicle seat corresponding to the requirements of a seat user.

For pivotally connecting the backrest structure with the seat part structure, the first frame part 1 is pivotally connected with the second frame part 2 via a fitting 3. In the illustrated exemplary embodiment, the fitting 3 is formed as rotary fitting and has a first fitting part 31 in the form of a cylindrical hollow gear with a circular cylindrical shell-shaped collar surface 310 and an internal toothing 312 as well as a second fitting part 32 in the form of an internal gear with an external toothing 320. Via its external toothing 320, the second fitting part 32 is in engagement with the internal toothing 312 of the first fitting part 31, wherein the tooth number of the external toothing 320 differs from that of the internal toothing 312 and the diameter of the internal toothing 312 also is smaller than the diameter of the external toothing 320 such that the second fitting part 32 can roll off on the internal toothing 312 of the first fitting part 31 with its external toothing 320, in order to realize an eccentric gearing.

In a cylindrical receiving opening 321 of the second fitting part 32 an eccentric consisting of two eccentric elements 34, 35 is arranged. The eccentric elements 34, 35 are rotatably mounted on a pin 311 of the first fitting part 31, are pretensioned against each other via a spring element 37 and via an actuating plate 36 are operatively connected with a drive element 38 which via a pin 381 is mounted on an inner, central bore of the pin 311 of the first fitting part 31. The drive element 38 with a head 380 rests in the cylindrical receiving opening 321 of the second fitting part 32 and has a through opening 382 in the form of a square into which an actuating shaft can engage, in order to actuate the drive element 38.

In operation, the drive element 38 is rotated about the swivel axis S, about which the drive element 38 is mounted on the pin 311 of the first fitting part 31, and hence the eccentric elements 34, 35 forming the eccentric also are moved in the cylindrical receiving opening 321 of the second fitting part, so that the second fitting part 32 thereby is actuated for rolling off on the internal toothing 312 of the first fitting part 31 and the second fitting part 32 is put into a rotary movement relative to the first fitting part 31.

For further details concerning the mode of operation of such rotary fitting reference is made for example to DE 10 2008 028 094 A1.

The second fitting part 32 is mounted on the first fitting part 31 and for this purpose held on the first fitting part 31 via a bearing ring 33, so that a bearing rim 323, on which the external toothing 320 of the second fitting part 32 is arranged, comes to lie between a bottom surface 314 of the first fitting part 31 and the bearing ring 33. In a depression defined by an edge portion 313 the bearing ring 33 here rests on a bearing surface 317 of the first fitting part 31 and is welded to the first fitting part 31.

The fitting 3 serves for the pivotal connection of the first frame part 1 with the second frame part 2. For this purpose, the first fitting part 31 is connected with the first frame part 1 via a reinforcement part 4, while the second fitting part 32 is arranged in an opening 20 of the second frame part 2 via a connecting collar 322 protruding from the bearing rim 323 in direction of the swivel axis S and is connected, in particular welded to the second frame part 2. The mode of action and operation of the reinforcement part as well as concrete exemplary embodiments of such reinforcement part are described in DE 10 2010 043 625 A1, whose content will be included herein.

Such reinforcement part 4 need not necessarily be provided, but the reinforcement part 4 also can be omitted. In this case, the first fitting part 31 is connected to the first frame part 1 directly—without interposition of a further component.

The first fitting part 31 is inserted into the opening 40 of the reinforcement part 4 for attachment to the associated first frame part 1 and via the collar surface 310 engaging into the opening 40 is connected with the reinforcement part 4 by welding, preferably by laser welding. With the connecting collar 322 on the other hand the second fitting part 32 engages into the opening 20 of the second frame part 2 such that a collar surface 324 of the connecting collar 322 pointing radially to the outside comes to lie in the region of an bearing portion 200 of the second fitting part 2 and thus the second fitting part 32 likewise can be connected with the second frame part 2 by welding, for example by laser welding.

In the sense of the present invention, the collar surface 310, 324 and the bearing portion 400, 200 delimiting the opening are in gap-free contact with each other at least at predetermined portions by action of a pretensioning force radial to the swivel axis S. Here, both the collar surface 310 of the first fitting part 31 can be in gap-free contact with the bearing portion 400 of the first frame part 1 and the collar surface 324 of the second fitting part 32 can be in gap-free contact with the bearing portion 200 of the second frame part 2.

The invention will be described below with reference to the pairing between the second fitting part 32 and the second frame part 2, wherein the description analogously also can apply to the pairing of the first fitting part 31 with the first frame part 1.

Figure 2A:
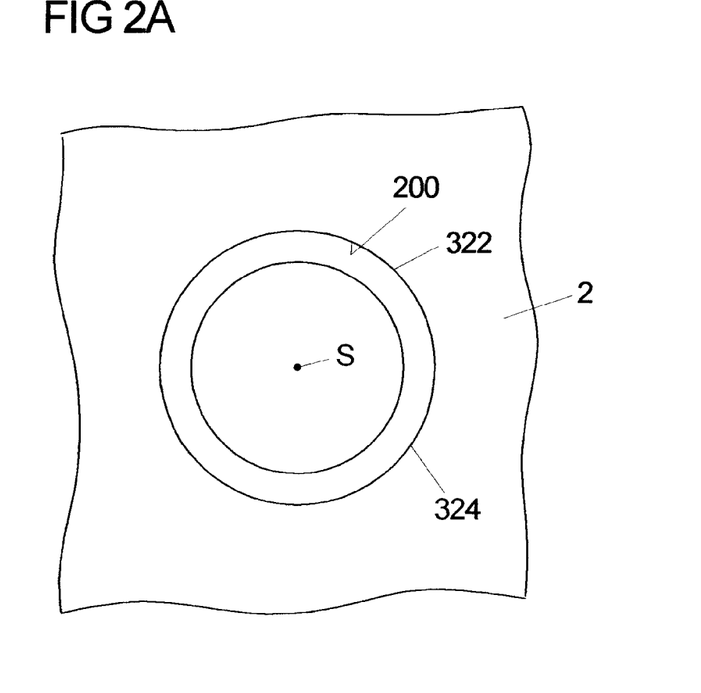
FIG. 2A shows a schematic view of an exemplary embodiment in which a collar surface of a fitting part circumferentially is in pressing contact with a bearing portion of a frame part.
Figure 2B:
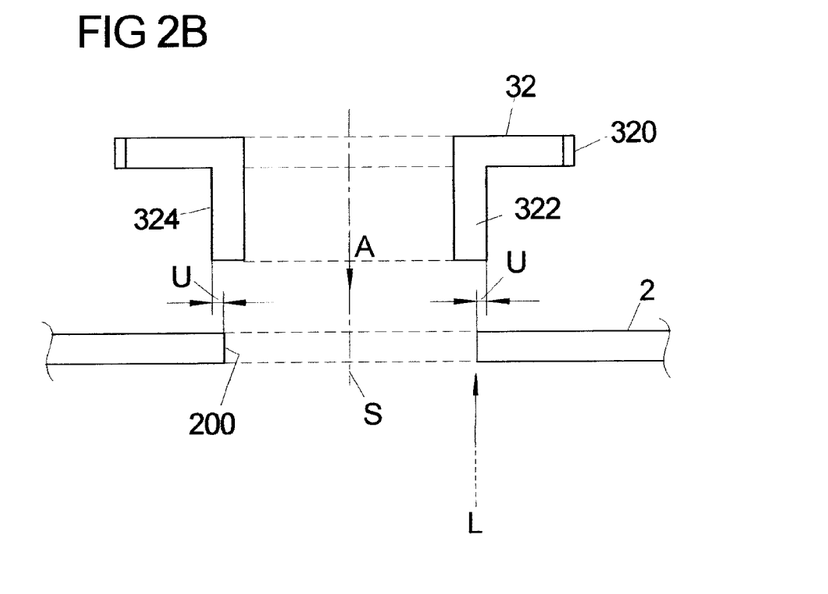
FIG. 2B shows a schematic sectional view of the arrangement according to FIG. 2A before the assembly, representing an existing oversize between the collar surface and the bearing portion.

In an exemplary embodiment shown in FIGS. 2A and 2B, the second fitting part 32 with its connecting collar 322 is pressed into the opening 20 of the second fitting part 2 delimited by the bearing portion 200. As shown in FIG. 2B, the collar surface 324 of the connecting collar 322 has an interference fit U with the bearing portion of the frame part 2, so that when pressing in the fitting part 32 in a pressing direction A during assembly, a press fit is obtained, which effects that in the state pressed in a radial pretensioning force acts between the connecting collar 322 and the frame part 2, i.e. between the collar surface 324 and the bearing portion 200.

Due to this radial pretensioning force, the collar surface 324 and the bearing portion 200 are pressingly held at each other, whereby it is effected that a substantially gap-free circumferential contact between the collar surface 324 and the bearing portion 200 is obtained. The gap-free contact effects that in a simple way a welding seam extending around the swivel axis S can be applied for the further fixation of the fitting part 32 at the frame part 2. The welding seam is applied at the site of the annular contact line between the collar surface 324 and the bearing portion 200 and is made for example, as shown in FIG. 2B, by a laser welding beam L directed vertically to the direction of extension of the frame part 2, i.e. tangentially to the flat extension of the bearing portion 200.

In principle, however, it is also possible to place other welding seams at another welding direction.

In the exemplary embodiment according to FIGS. 2A, 2B a substantially full, pressing contact between the collar surface 324 and the bearing portion 200 is obtained. Thus, a substantially gap-free fit is obtained between the connecting collar 322 and the frame part 2 in the opening 20. Advantageously, the collar surface 324 and the bearing portion 200 therefore have a deviation from the ideal roundness, which does not exceed 0.3 mm (as measured in radial direction to the swivel axis S).

In the exemplary embodiments according to FIGS. 3 to 7, discontinuities are provided between the collar surface 310 of the first fitting part 31 and the associated bearing portion 400 of the first frame part 1 and/or between the collar surface 324 of the second fitting part 32 and the associated bearing portion 200 of the second fitting part 32, which interrupt the ring shape of the collar surface 310, 324 or of the respectively associated bearing portion 400, 200, in order to in this way achieve a minimization of a joining gap F (see e.g. FIG. 4) or a centering of the collar surface 310, 324 relative to the respectively associated bearing portion 400, 200, in order to render the width of the joining gap F more uniform. The exemplary embodiments explain the discontinuities with reference to the pairing of the collar surface 324 of the second fitting part 32 and of the bearing portion 200 of the second frame part 2. Corresponding discontinuities analogously also can be used in the pairing of the collar surface 310 of the first fitting part 31 and the bearing portion 400 of the first frame part 1, wherein it of course also is conceivable to use such discontinuities merely for one pairing.

Figure 3:
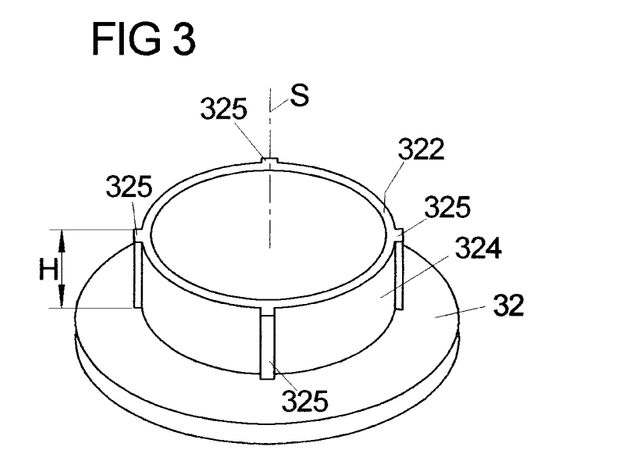
FIG. 3 shows a schematic view of an exemplary embodiment of a fitting part with discontinuities in the form of protrusions arranged on a collar surface.

In an exemplary embodiment shown in FIG. 3 protrusions 325 are provided on the collar surface 324 of the connecting collar 322 of the second fitting part 32, which are integrally molded to the connecting collar 322, protrude radially to the outside in direction of the associated bearing portion 200 and axially extend parallel to the swivel axis S. The protrusions 325 have an oversize with respect to the bearing portion 200 (see FIG. 1) of the associated second frame part 2, so that when mounting the second fitting part 32 on the second frame part 2, the protrusions 325 are pressed into the opening 20 by centering the second fitting part 32 relative to the bearing portion 200. There is obtained a joining gap F which—as seen in circumferential direction around the swivel axis S—has an at least approximately uniform radial width.

In the region of the protrusions 325 the connecting collar 322 also rests against the bearing portion 200 without leaving a gap, so that a welding seam easily can be applied in the region of the protrusions and possibly in addition at the joining gap F—by bridging the joining gap F.

In the exemplary embodiment, the protrusions 325 extend over the entire height H of the connecting collar 322. It also is conceivable that the protrusions 325 only extend over a part of the axial height H of the collar surface 324, e.g. exclusively over the region of the connecting collar 322 to be fitted into the opening 20 of the second frame part.

Figure 4:
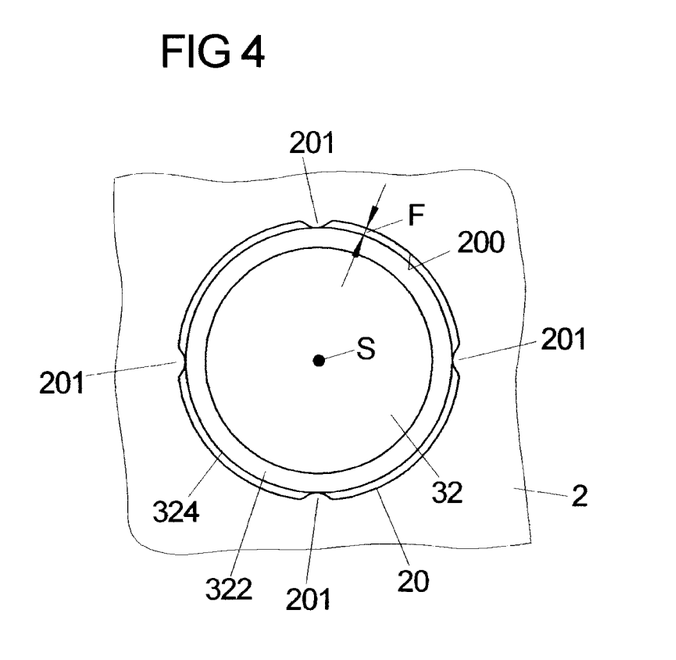
FIG. 4 shows a schematic view of an exemplary embodiment in which discontinuities in the form of protrusions are arranged on a bearing portion of a frame part.

In a second exemplary embodiment, shown in FIG. 4, protrusions 201 protruding radially to the inside are provided on the bearing portion 200 of the second frame part 2. The protrusions 201 produce the same effect as the protrusions 325 in the exemplary embodiment according to FIG. 3 and serve for centering the collar surface 324 of the second fitting part 32 relative to the bearing portion 200 of the second frame part 2 for adjusting a width of a joining gap F uniform in circumferential direction. Again, a gap-free contact is obtained in the region of the protrusions 201.

Figure 5:
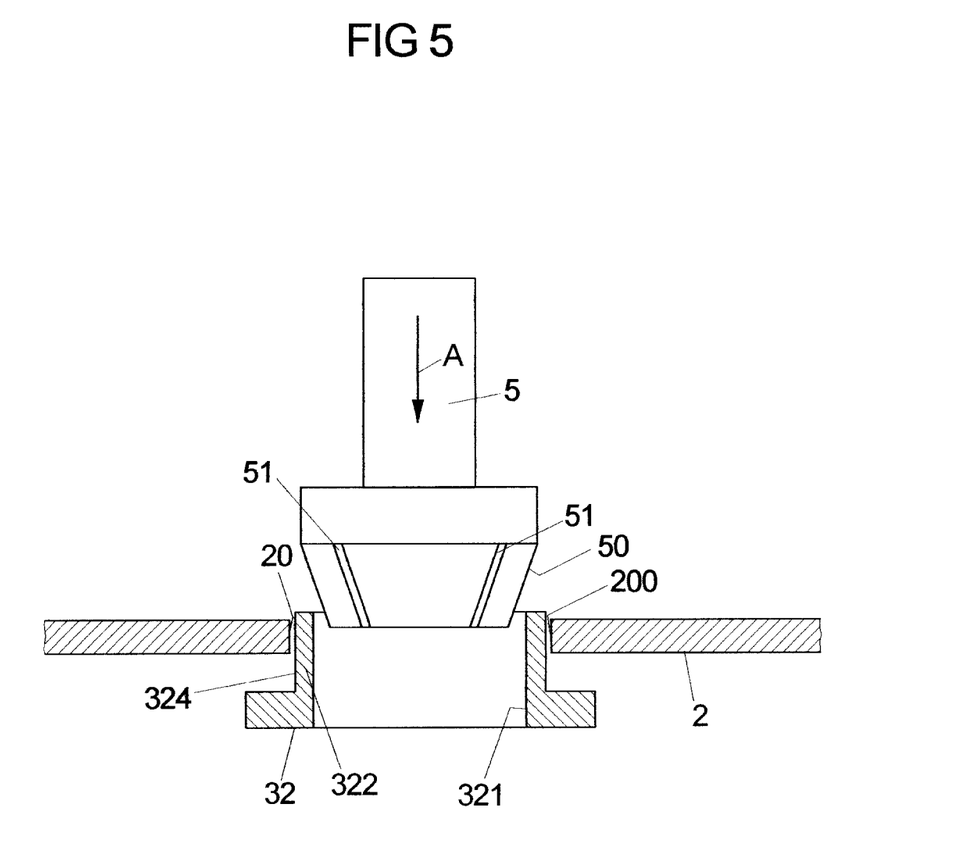
FIG. 5 shows a schematic view of an exemplary embodiment in which discontinuities in the form of protrusions are integrally molded to a collar surface by means of a stamp.

In the exemplary embodiment according to FIG. 5, protrusions on the other hand are molded into the collar surface 324 after insertion. This is effected in that with the connecting collar 322 inserted into the opening 20 a stamp 5 with an at least sectionally cone-shaped stamp head 50 is pressed into the receiving opening 321 of the fitting part 32 in a pressing direction A, whereby webs 51 formed on the stamp head 50 are pressed into the connecting collar 322 and lead to the fact that protrusions protruding radially to the outside on the collar surface 324 are pressed out. By means of the stamp 5, the collar surface 324 is made non-round, whereby centering of the connecting collar 322 relative to the bearing portion 200 is effected and in addition the collar surface 324 at least sectionally is brought into a pressing contact with the bearing portion 200.

In the exemplary embodiments according to FIGS. 3 to 5, a joining gap F is at least not fully eliminated, but the collar surface 324 of the fitting part 32 is centered relative to the associated bearing portion 200 of the frame part 2, so that a uniform joining gap F is obtained. This provides for applying a welding seam of high quality on the one hand in the region of the sectionally gap-free contact and also at the joining gap F of uniform width, wherein it should be ensured that the set joining gap F easily can be bridged by the used welding method, for example by laser welding, so that the risk of a seam collapse or occurring holes in the welding seam is reduced.

In the exemplary embodiments according to FIGS. 3 and 4 the protrusions 325 and 201 already are molded to the frame part 2 before assembly of the fitting part 32, wherein—with regard to the protrusions 325 and 201—an interference fit is obtained. Because the protrusions 325, 201 however only effect a small surface pressure, pressing in can be effected without much expenditure of force.

In the exemplary embodiments according to FIG. 5, mounting of the protrusions 201 can be effected during assembly and thus with the fitting part 32 already inserted into the opening 20. Pressing together thus is effected during the running assembly process.

Figure 6:
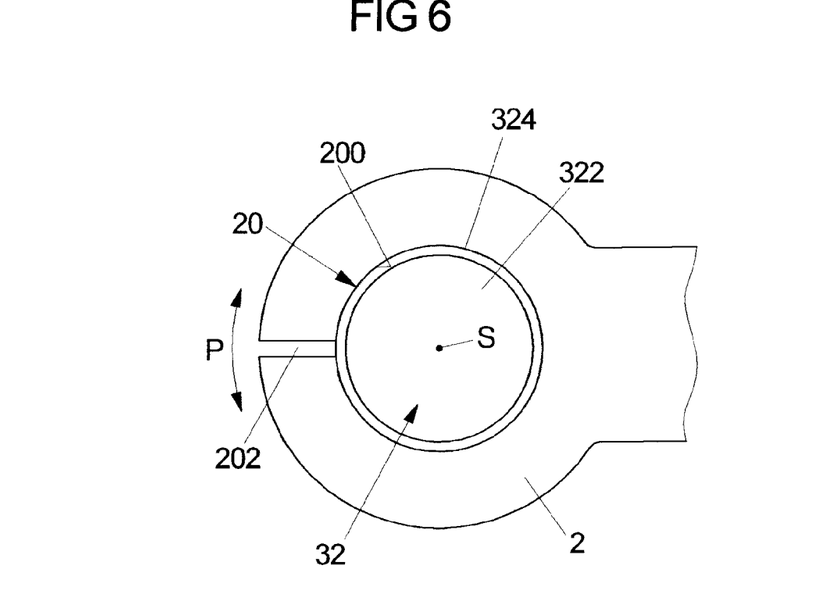
FIG. 6 shows a schematic view of an exemplary embodiment in which a discontinuity on an bearing portion of a frame part is realized by a gap.

In the exemplary embodiment shown in FIG. 6, a gap 202 is formed as discontinuity in the region of the bearing portion 200 of the second frame part 2. The gap 202 interrupts the bearing portion 200 in circumferential direction about the swivel axis S and enables the frame part 2 to widen in direction of arrow P, when the second fitting part 32 is pressed into the opening 20 of the second frame part 2 with an interference fit.

In the exemplary embodiment according to FIG. 6, the joining gap F between the collar surface 324 of the second fitting part 32 and the bearing portion 200 of the second frame part 2 largely is eliminated, so that no joining gap F is obtained and welding of the second fitting part 32 to the second frame part 2 easily is possible.

Figure 7:
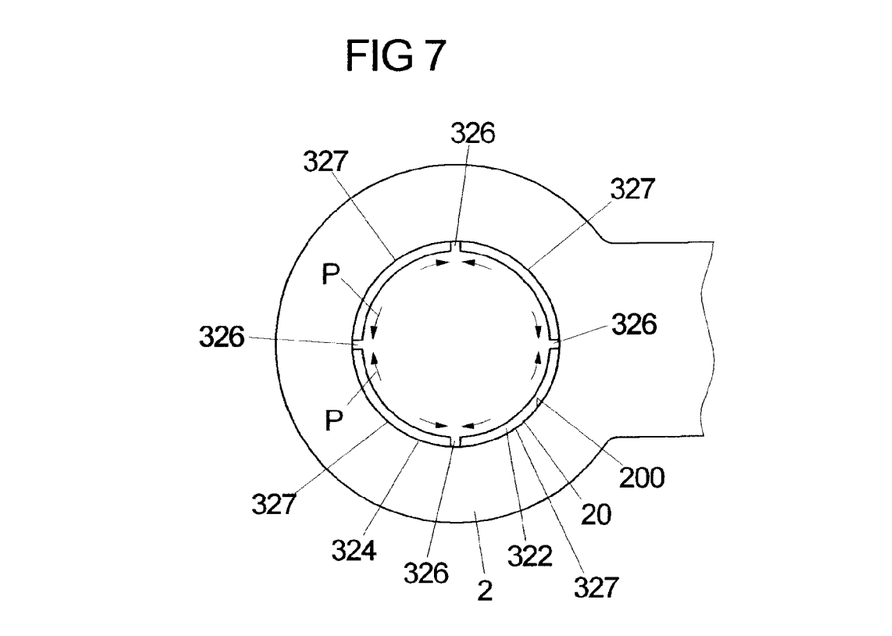
FIG. 7 shows a schematic view of an exemplary embodiment in which discontinuities in the form of gaps are arranged on a collar surface of a fitting part.

In the exemplary embodiment according to FIG. 7, gaps 326 are provided on the connecting collar 322 of the second fitting part 32, which locally interrupt the collar surface 324 of the second fitting part 32. When the connecting collar 322 is pressed into the opening 20 of the second frame part 2 with an interference fit, the collar surface 324 is compressed in direction of arrow P in the region of the gap 326, in order to reduce the diameter of the connecting collar 322, so that the connecting collar 322 can be pressed into the opening 20 with a reduced expenditure of force—as compared to the closed connecting collar 322. Again, the joining gap F largely is eliminated, so that welding easily is possible.

The above-described exemplary variants of discontinuities on the collar surface 324 or the bearing portion 200 also can be combined with each other. Thus, it is possible to provide protrusions 325, 201 both on the collar surface 324 and on the bearing portion 200. For example, it likewise is conceivable to provide both protrusions 325, 201 and gaps 326, 202, for example protrusions 325 on the collar surface 324 and a gap 202 on the bearing portion 200.

The idea underlying the invention is not limited to the exemplary embodiments described above, but rather can also be realized in principle in completely different embodiments.

In particular, the measures for minimizing a joining gap or for centering a collar surface relative to an bearing portion as described here can be used for the attachment of both fitting parts to the respectively associated frame parts, wherein it is of course also possible to provide such measures only on the pairing of a fitting part and a frame part.

Although the invention has been described above with reference to an exemplary embodiment of a rotary fitting, the invention easily can also be applied to a fitting in the form of a detent fitting.

The invention claimed is:

1. A seat frame of a vehicle seat, the seat frame comprising:
   a first frame part,
   a second frame part,
   a fitting which pivotally connects the first frame part with the second frame part about a swivel axis,
   a first fitting part of the fitting which is connected with the first frame part, and
   a second fitting part of the fitting which is connected with the second frame part and which, for pivoting the first frame part and the second frame part relative to each other, is adjustable with respect to the first fitting part,
   wherein at least one of the first fitting part and the second fitting part has an annular collar surface extending around the swivel axis and pointing radially to the outside, via which the associated fitting part is connected with an annular bearing portion of the associated frame part, which delimits an opening, and
   wherein the collar surface and the bearing portion delimiting the opening are in gap-free contact with each other at least at predetermined portions, a pretensioning force acting in between the collar surface and the bearing portion along a direction radial to the swivel axis,
   wherein at least one of the collar surface and the bearing portion comprises at least three radially protruding protrusions, a press fit being formed between the collar surface and the bearing portion at the at least three protrusions.

2. The seat frame according to claim 1, wherein the collar surface is pressed into the opening delimited by the bearing portion.

3. The seat frame according to claim 2, wherein the collar surface and the bearing portion delimiting the opening circumferentially are in pressing contact with each other, wherein for this purpose the collar surface and the bearing portion have a maximum deviation from an ideal roundness of +/−0.3 mm.

4. The seat frame according to claim 1, wherein the collar surface and the bearing portion delimiting the opening form an interference fit at least at the predetermined portions.

5. The seat frame according to claim 1, wherein the collar surface and the bearing portion are laser-welded to each other at least at the predetermined portions.

6. The seat frame according to claim 1, wherein the collar surface and the bearing portion are laser-welded to each other exclusively at the predetermined portions.

7. The seat frame according to claim 1, wherein the protrusions are integrally molded to the collar surface and/or the bearing portion and extend axially parallel to the swivel axis.

8. A seat frame of a vehicle seat, the vehicle seat comprising:
   a first frame part,
   a second frame part,
   a fitting which pivotally connects the first frame part with the second frame part about a swivel axis,
   a first fitting part of the fitting, which is connected with the first frame part, and
   a second fitting part of the fitting, which is connected with the second frame part and which for pivoting the first frame part and the second frame part relative to each other is adjustable with respect to the first fitting part,
   wherein at least one of the first fitting part and the second fitting part has an annular collar surface extending around the swivel axis and pointing radially to the outside, via which the associated fitting part is connected with an annular bearing portion of the associated frame part, which delimits an opening, and
   wherein the collar surface and the bearing portion delimiting the opening are in gap-free contact with each other at least at predetermined portions, a pretensioning force acting in between the collar surface and the bearing portion along a direction radial to the swivel axis,
   wherein at least one gap is arranged on at least one of the collar surface and the bearing portion, the gap interrupting the collar surface or the bearing portion when viewed along a circumferential direction around the swivel axis.

9. The seat frame according to claim 8, wherein the at least one gap on the collar surface extends axially parallel to the swivel axis.

10. The seat frame according to claim 8, wherein the at least one gap on the bearing portion extends radially to the swivel axis.

11. The seat frame according to claim 8, wherein multiple gaps are uniformly distributed along the circumferential direction.

* * * * *